Patented Dec. 29, 1931

1,838,431

UNITED STATES PATENT OFFICE

CHARLES H. MILLIGAN, OF NEWARK, NEW JERSEY, ASSIGNOR TO THE AMERICAN AGRICULTURAL CHEMICAL COMPANY

PROCESS FOR OBTAINING ORTHOPHOSPHORIC ACID AND/OR CONVERSION PRODUCTS THEREOF

No Drawing. Application filed August 26, 1930. Serial No. 477,986.

My invention is applicable generally to the recovery of phosphoric compounds from materials containing inorganic phosphates and/or acid phosphates. Suitable materials are; animal bone matter, deposits containing recent or fossil bone matter, mineral deposits containing phosphates of any kind, such as apatite, and artificial materials, such as superphosphates.

The first step in my process consists in treating the raw material with sulphuric acid of a concentration appropriate to replace and liberate the combined phosphoric acid, with the resultant formation of free phosphoric acid. While I may employ any concentration of sulphuric acid which will accomplish this purpose, I find acid of from 25 to 93% $H_2SO_4$ content, to be effective, and prefer acid of from 50 to 80% $H_2SO_4$ content, for example 75%. The amount of acid to be applied must be sufficient to form orthophosphoric acid, and for maximum recovery should be sufficient to convert the major part of the combined phosphoric acid to this form. The mixture of acid and raw material is preferably denned to complete the reaction and the mixture of gangue or earthy material carrying soluble reaction products is then extracted by the use of an extraction liquid which is water immiscible and is a solvent for orthophosphoric acid. For the purposes of this application, I may define a water immiscible extraction liquid to be one which is not soluble in water or in aqueous solutions of phosphoric acid in excess of 10% by weight of the total, although a solubility under 2% is desirable. A converse tendency of water to dissolve in the extraction liquid is not ordinarily detrimental, provided the extraction liquid does not thereby acquire water solubility in excess of the limit hereinabove mentioned.

I have found that a particularly efficacious extraction medium which may be employed either alone or in combination with other organic compounds is amyl alcohol. The term "amyl alcohol" as herein employed, denotes either a normal, secondary or tertiary amyl alcohol and/or any mixture of isomeric amyl alcohols, either synthetic or of natural origin, such as fusel oil. Where the amyl alcohol is employed in combination with other components the extraction liquid must be water immiscible, as hereinabove defined, and must be a solvent for orthophosphoric acid. For this purpose the other components present may be selected from the water immiscible oxygenated hydrocarbon liquids of not exceeding 8 carbon atoms in the chain carrying the oxygen group. The advantages arising from the use of amyl alcohol are to an extent at least proportional to the amount of amyl alcohol present, and for this reason I prefer an extraction liquid consisting predominantly of amyl alcohol or consisting of amyl alcohol carrying in solution not exceeding a few percent of water.

The inorganic acid may be mixed with the raw material in any desired type of mixing apparatus, and the extraction liquid may be incorporated with the products of the reaction in any suitable type of mixing apparatus. The extraction liquid may be thereafter separated from the residue of undissolved material by settling and decanting, by filtration, centrifuging or any other suitable procedure. After separation of the extraction liquid, the last traces may be removed by steaming. The undissolved material may be thereafter washed with water for the separation of an additional quantity of phosphoric material of lesser purity.

I have found that where the sulphuric acid applied to the phosphate containing material is theoretically sufficient to combine with the bases present, either free or combined with other acids than sulphuric oxide, the extraction liquid does not separate a pure phosphoric acid but a mixture of phosphoric acid with the sulphuric acid employed. I have further found that by limiting the amount of sulphuric acid so that it is less than theoretically necessary to combine with the bases present, either free or combined with other acids than sulphuric oxide, the extraction liquid may be caused to separate a relatively pure phosphoric acid free from the applied sulphuric acid. Any reduction from the theoretical will prove beneficial, and by a relatively slight reduction the extraction liquid may be caused to extract a phosphoric acid which is either free from sulphuric acid or in which the sulphuric acid is present in amount so small as not to be detectable by the usual analytical methods.

The extent of reduction to be made industrially may be determined by a series of preliminary experiments in which the sulphuric acid is reduced below the theoretical in successive increments until the desired freedom of the extracted phosphoric acid from the applied inorganic acid is obtained.

In order to produce a satisfactory yield of phosphoric acid, the sulphuric acid should be applied in amount approaching the theoretical. The formation of phosphoric acid from a raw material containing neutral phosphates, for example, may be assisted by the addition of sulphuric acid sufficient to combine even with relatively weak bases which are simultaneously present. The mixture is preferably denned, say at a temperature in excess of 75° C., for a period of several hours, to permit the reaction to proceed, and during this stage volatile acids may be generated and thrown off by the action of the sulphuric acid on salts of volatile acids which are present in the raw material. For these reasons the amount of sulphuric acid applied should approach that theoretically necessary to combine with the bases present, either free or combined with other acids than sulphuric oxide. The exact reduction from the theoretical necessary to yield a phosphoric acid of the desired purity may be determined by a series of preliminary tests in which various amounts of sulphuric acid less than the theoretical are mixed with test batches of the raw material. Such batches should be held at a temperature of at least 75° C. for several hours, and thereafter extracted with an extraction liquid of the type hereinbefore described. By analytical tests applied to the material so extracted, it may be easily determined when the desired freedom from sulphuric acid has been achieved, and the same relative proportion of sulphuric acid may then be applied industrially with the consequent recovery of phosphoric acid of corresponding relative purity.

Among other advantages, the use of solutions comprising amyl alcohol combines a high solubility for phosphoric acid with a marked ease of recovery of the phosphoric acid so dissolved, either as phosphoric acid or in the form of conversion products thereof. The use of amyl alcohol also inhibits the solution tendency of undesired compounds which possess an appreciable solubility in water miscible extraction liquids. After the extraction liquid has been contacted with phosphatic material resulting from the sulphuric acid treatment, the extraction liquid may be separated in any suitable manner, as, for example, decantation, filtration or centrifuging. The last traces of the extraction liquid may be recovered by steaming the residue of undissolved material. If desired, a water wash may be thereafter applied to the residue for the purpose of separating an additional quantity of material of lesser purity which may contain orthophosphoric acid and/or acid phosphates.

While various methods are available for the recovery of the orthophosphoric acid from the extraction liquid, I prefer the following:

I may, for example, recover the orthophosphoric acid by simply contacting the extraction liquid with water, in which case the orthophosphoric acid passes predominantly into the water layer, thereby placing the extraction liquid in condition for reuse and rendering possible a very simple cyclic process.

In one concrete experiment, for example, 100 grams of apatite containing 74% of tricalcium phosphate was treated with 100 grams of 75% sulphuric acid. After completion of the reaction the mixture was mixed with 200 cc. of fusel oil which was preponderantly a mixture of isomeric amyl alcohols. The extraction liquid was separated from undissolved material by decantation and was found to contain 11.36 grams of orthophosphoric acid. On contacting the extraction liquid with 50 cc. water, mixing and settling, the water layer was found to contain 9.0 grams of orthophosphoric acid.

Another method of separation which I prefer where a concentrated solution of orthophosphoric acid is desired, consists in adding to the extraction liquid a second liquid which is miscible with the extraction liquid but which is not, per se, a solvent for orthophosphoric acid. The hydrocarbons of low molecular weight and halogenated derivatives thereof may be so employed, although I prefer benzol for this purpose.

The foregoing description is for purposes of illustration and not of limitation, and it is therefore my intention that the invention be limited only by the appended claims or their equivalents in which I have endeavored to claim broadly all inherent novelty.

I claim:

1. Process of obtaining phosphoric acid or conversion products thereof from materials containing inorganic phosphates, which comprises admixing a phosphate containing material with sulphuric acid in quantity sufficient to form orthophosphoric acid, thereafter contacting the admixed materials with an extraction liquid comprising amyl alcohol, which extraction liquid is water immiscible and is a solvent for orthophosphoric acid, thereafter separating said extraction liquid and dissolved phosphoric acid from undissolved material, and removing the dissolved phosphoric acid or conversion products thereof from said extraction liquid.

2. Process according to claim 1, in which the dissolved phosphoric acid is removed from said extraction liquid by contacting said extraction liquid with water.

3. Process according to claim 1, in which the dissolved phosphoric acid is removed from said extraction liquid by adding to said extraction liquid a water immiscible substance or substances in which the disolved phosphoric acid is not soluble.

4. Process according to claim 1, in which the dissolved phosphoric acid is removed from said extraction liquid by adding benzol to said extraction liquid.

5. Process of obtaining phosphoric acid or conversion products thereof from materials containing inorganic phosphates, which comprises admixing a phosphate containing material with sulphuric acid in quantity sufficient to form orthophosphoric acid, thereafter contacting the admixed materials with an extraction liquid consisting predominantly of amyl alcohol, which extraction liquid is water immiscible and is a solvent for orthophosphoric acid, thereafter separating said extraction liquid and dissolved phosphoric acid from undissolved material, and removing the dissolved phosphoric acid or conversion products thereof from said extraction liquid.

6. Process according to claim 5, in which the dissolved phosphoric acid is removed from said extraction liquid by contacting said extraction liquid with water.

7. Process according to claim 5, in which the dissolved phosphoric acid is removed from said extraction liquid by adding to said extraction liquid a water immiscible substance or substances in which the dissolved phosphoric acid is not soluble.

8. Process according to claim 5, in which the dissolved phosphoric acid is removed from said extraction liquid by adding benzol to said extraction liquid.

9. Process of obtaining phosphoric acid or conversion products thereof from materials containing inorganic phosphates, which comprises admixing a phosphate containing material with sulphuric acid in quantity sufficient to form orthophosphoric acid, but less than the quantity of sulphuric acid required to combine with the bases present in the material, either free or combined with other acids than sulphuric oxide, thereafter contacting the admixed materials with an extraction liquid comprising amyl alcohol, which extraction liquid is water immiscible and is a solvent for orthophosphoric acid, thereafter separating said extraction liquid and dissolved phosphoric acid from undissolved material, and removing the dissolved phosphoric acid or conversion products thereof from said extraction liquid.

10. Process according to claim 9, in which the dissolved phosphoric acid is removed from said extraction liquid by contacting said extraction liquid with water.

11. Process according to claim 9, in which the dissolved phosphoric acid is removed from said extraction liquid by adding to said extraction liquid a water immiscible substance or substances in which the dissolved phosphoric acid is not soluble.

12. Process according to claim 9, in which the dissolved phosphoric acid is removed from said extraction liquid by adding benzol to said extraction liquid.

13. Process of obtaining phosphoric acid or conversion products thereof from materials containing inorganic phosphates, which comprises admixing a phosphate containing material with sulphuric acid in quantity sufficient to form orthophosphoric acid, but less than the quantity of sulphuric acid required to combine with the bases present in the material, either free or combined with other acids than sulphuric oxide, thereafter contacting the admixed materials with an extraction liquid consisting predominantly of amyl alcohol, which extraction liquid is water immiscible and is a solvent for orthophosphoric acid, thereafter separating said extraction liquid and dissolved phosphoric acid from undissolved material, and removing the dissolved phosphoric acid or conversion products thereof from said extraction liquid.

14. Process according to claim 13, in which the dissolved phosphoric acid is removed from said extraction liquid by contacting said extraction liquid with water.

15. Process according to claim 13, in which the dissolved phosphoric acid is removed from said extraction liquid by adding to said extraction liquid a water immiscible substance or substances in which the dissolved phosphoric acid is not soluble.

16. Process according to claim 13, in which the dissolved phosphoric acid is removed from said extraction liquid by adding benzol to said extraction liquid.

CHARLES H. MILLIGAN.